United States Patent
Breuer et al.

(10) Patent No.: US 8,775,047 B2
(45) Date of Patent: Jul. 8, 2014

(54) DRIVER ASSISTANCE SYSTEM AND METHOD FOR CONTROLLING A VEHICLE BRAKE SYSTEM

(75) Inventors: Karsten Breuer, Lauenau (DE); Thomas Dieckmann, Pattensen (DE); Torsten Wallbaum, Duingen (DE)

(73) Assignee: WABCO GmbH, Hannover (DE)

( * ) Notice: Subject to any disclaimer, the term of this patent is extended or adjusted under 35 U.S.C. 154(b) by 190 days.

(21) Appl. No.: 13/501,611

(22) PCT Filed: Oct. 27, 2010

(86) PCT No.: PCT/EP2010/006545
§ 371 (c)(1),
(2), (4) Date: Apr. 12, 2012

(87) PCT Pub. No.: WO2011/069582
PCT Pub. Date: Jun. 16, 2011

(65) Prior Publication Data
US 2012/0203438 A1    Aug. 9, 2012

(30) Foreign Application Priority Data
Dec. 12, 2009  (DE) .......................... 10 2009 058 154

(51) Int. Cl.
G06F 7/70    (2006.01)
(52) U.S. Cl.
USPC ............................................ 701/70; 340/435
(58) Field of Classification Search
USPC ............. 701/70; 303/132, 160, 166; 340/435, 340/452, 453
See application file for complete search history.

(56) References Cited

U.S. PATENT DOCUMENTS

| | | | |
|---|---|---|---|
| 7,102,495 B2 | 9/2006 | Mattes et al. | |
| 7,234,786 B2 | 6/2007 | Mori et al. | |
| 7,416,263 B2 | 8/2008 | Schmitt | |
| 2004/0041471 A1 | 3/2004 | Hellmann et al. | |
| 2005/0159876 A1 | 7/2005 | Sugano | |
| 2007/0069578 A1 | 3/2007 | Hille et al. | |
| 2008/0243335 A1* | 10/2008 | Rao et al. | 701/38 |

FOREIGN PATENT DOCUMENTS

| | | |
|---|---|---|
| DE | 101 18 707 A1 | 10/2002 |
| DE | 101 18 708 A1 | 10/2002 |
| DE | 101 44 879 C1 | 9/2003 |
| DE | 103 25 266 A1 | 1/2004 |
| DE | 103 55 219 A1 | 6/2005 |
| DE | 10 2005 011 415 A1 | 10/2005 |
| EP | 1 127 761 A2 | 8/2001 |
| EP | 1 616 764 A2 | 1/2006 |
| WO | WO 2004/045898 A2 | 6/2004 |

* cited by examiner

*Primary Examiner* — Thomas Black
*Assistant Examiner* — Luke Huynh
(74) *Attorney, Agent, or Firm* — Kramer Levin Naftalis & Frankel LLP

(57) ABSTRACT

For a vehicle having a brake system, a driver assistance system includes a detection system having at least one sensor configured to output measurement signals, and a control unit configured to receive at least one measurement signal, determine whether the vehicle is in a critical state based on measurement signal(s), and output an external brake request signal to a brake control device of the brake system for priming or biasing the brake system when the vehicle is determined to be in the critical state. The external brake request signal comprises an acceleration setpoint value signal having a higher acceleration setpoint value than a current actual acceleration value of the vehicle.

14 Claims, 2 Drawing Sheets

DRIVER ASSISTANCE SYSTEM AND METHOD FOR CONTROLLING A VEHICLE BRAKE SYSTEM

FIELD OF THE INVENTION

The present invention generally relates to a driver assistance system and a method for controlling a vehicle brake system.

BACKGROUND OF THE INVENTION

Driver assistance systems generally serve to assist the driver in controlling the vehicle during driving. Such systems can, in particular, be surroundings detection systems that detect foreign objects by means of suitable sensors in order to change the driving behavior of the vehicle correspondingly. In this context, on the one hand, a collision with a detected external object can be prevented or the severity of an accident can be reduced by braking the vehicle suitably. Furthermore, a vehicle that is traveling ahead can be detected and the distance from the driver's own vehicle can be regulated, for example, in the form of an ACC (adaptive cruise control) process or as the vehicle traveling in a convoy mode in a line composed of a plurality of vehicles. In particular, radar-based or ultrasound-based sensors can be used as surroundings detection sensors for detecting distance, and video systems can be used for recording and detecting the objects and, if appropriate, for detecting distance through the evaluation of stereo images. Furthermore, the driver assistance systems may also be systems that detect a critical driving state, for example, a tendency of the vehicle to tip over or a tendency of the vehicle to skid, and that communicate this to the brake control device.

Driver assistance systems are typically implemented separately from the brake control device, and can output what are referred to as external brake request signals to the brake control device of the brake system, in particular, via a data bus. The brake control device therefore carries out a control process of the brakes on the basis of internal brake signals, which may comprise, in particular, the setpoint brake request input by the driver via a brake value signal generator and, for example, internal closed-loop control processes such as ABS or a stability control process, and on the basis of additional external brake request signals.

DE 101 18 708 A1 and DE 101 18 707 A1 describe processes for regulating vehicle speed and for preventing collisions, in which, when a possibly imminent braking intervention is detected, a hydraulic brake system can be biased by increasing the brake pressure of the brake hydraulics without an appreciable braking operation already being initiated. For this purpose, an appropriate flag can be set by a decision unit that also receives a brake request signal S1 of the driver. The actual braking operation can therefore subsequently be carried out more quickly since the corresponding pressure build-up of the brake hydraulics does not have to be initiated first so that time can be gained during the actual braking operation.

Such biasing when a relatively high probability of a collision is detected may be carried out in a hydraulic brake system in a directly internal fashion by means of the control device. However, in the case of pneumatic brake systems of commercial vehicles, surroundings detection systems are generally embodied as external systems that communicate with the brake control device, for example, via a vehicle-internal data bus such as the CAN bus, and by means of suitable protocols. The external request for biasing without a braking effect, or without a relevant braking effect, would therefore require a suitable set of instructions that cannot be implemented with current systems.

In pneumatic brake systems of a commercial vehicle field, external brake requests can be requested by means of various standards. SAE-J1939 describes the logging of such external brake requests, and, accordingly, an external brake request contains information about the priority, the control mode, and the acceleration setpoint value.

The indication of the priority is relevant since, according to this standard, the external brake request signal is continuously output by the external system, with the result that when a necessary braking effect is absent, a low priority is specified; in the case of a priority signal with three stages, the lowest priority can therefore be indicated. The control mode can, in particular, be additive or maximal; in the case of an additive control mode the external brake request is set in addition (additively) to the internally set braking effect, and, on the other hand, in the case of a maximum control mode, formation of a maximum value is brought about, i.e., the highest value of the internal brake request and the highest value of the external brake request are respectively formed. Furthermore, the external brake request signal has an indication about the setpoint acceleration to be set, i.e., the acceleration setpoint value, wherein braking operations correspondingly have a negative value.

SUMMARY OF THE INVENTION

Generally speaking, it is an object of the present invention to provide a driver assistance system and a corresponding method for controlling a vehicle brake system that permits rapid initiation of a braking process in critical situations with relatively low expenditure.

According to an embodiment of the present invention, biasing of the brake system is made possible when a sufficient probability of a critical state has been detected by an external driver assistance system, which allows a necessary braking operation to initiate more quickly at a later time. Depending on the driver assistance system, different critical states can be detected. In the case of a surroundings detection system, in particular, a probability of a collision can be detected. In the case of an external driving stability system, instabilities of the vehicle itself or unstable states of other vehicles of a vehicle-trailer combination can be detected, and an external brake request signal can be formed therefrom and fed to the brake control device.

Embodiments of the present invention can, in particular, be used in commercial vehicles that generally employ pneumatic brakes, in which relatively high values of mass inertia and relatively high lag times for overcoming the clearance and filling the wheel brake cylinders with the brake medium are present (for example, 200 to 300 ms in the case of an EBS and 500 to 700 ms in the case of an ABS, compared to, for example, values of 100 to 150 ms in the case of a hydraulic brake system).

An external driver assistance system is understood to be a driver assistance system that is not configured as part of the brake control system and therefore outputs a brake request as an external brake request signal to the brake control device. This may occur, in particular, via a data bus of the vehicle, such as a CAN bus. Biasing of the brake system is understood to mean increasing the pressure in the braking medium in order to overcome idle travel or clearance, with the result that braking surfaces are entirely or largely in contact with one another, wherein, under certain circumstances, a small amount of wear occurs on the braking surfaces with a negligible braking effect under certain circumstances.

According to an embodiment of the present invention, biasing of the brake system is effected by means of an external brake request signal, which is generally already present in such vehicles and is also used to initiate an actual braking process. In this context, this external brake request signal is set such that a high acceleration setpoint value is specified, in particular, a value that will not bring about the initiation of an actual braking process when the signal is received by the brake control device. In this context, it is, in particular, possible to predefine an acceleration setpoint value which is above the current actual acceleration value, i.e., is directed at a relatively high acceleration, while taking into account signs and absolute value, and therefore cannot be achieved by a braking operation. In this way, the brake system cannot set this value by activating brakes. Nevertheless, a high priority is advantageously set so that the signal has to be complied with.

The biasing of the brake system is therefore made possible by systems that are basically already present and by existing protocols. The brake control device can receive the external brake request signal and interpret it such that, at that particular time, no actual braking operation is initiated, but owing to the high priority, a biasing process in order to overcome the lag time is already initiated. In this context, the output of such an external brake request signal is not critical with respect to the safety of the vehicle, since no actual braking operation is initiated yet, and at most, an insignificant deceleration is brought about due to the brake linings coming slightly into contact with the brake disk.

Advantageously, biasing of the brake system can be initiated in a simple way by an external system using given protocol features.

Embodiments of the present invention can be used, for example, in an emergency braking system (AEBS), a collision mitigating system (CMS), a collision warning system (CWS), an adaptive cruise control system (ACC), or a convoy system for a plurality of vehicles, as well as in a predictive braking assistance system, a low speed collision warning system, in particular for turning maneuvers (e.g., for the purpose of protecting pedestrians, cyclists and other relatively vulnerable road users), such as a blind-spot detection system (BSD), and in a driving stability system (for example, for detecting tendencies to roll over), such as a Roll Stability Control system (RSC).

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention will be explained in more detail below using a number of exemplary embodiments and with reference to the appended drawings, in which.

DETAILED DESCRIPTION OF THE PREFERRED EMBODIMENTS

Figure 1:
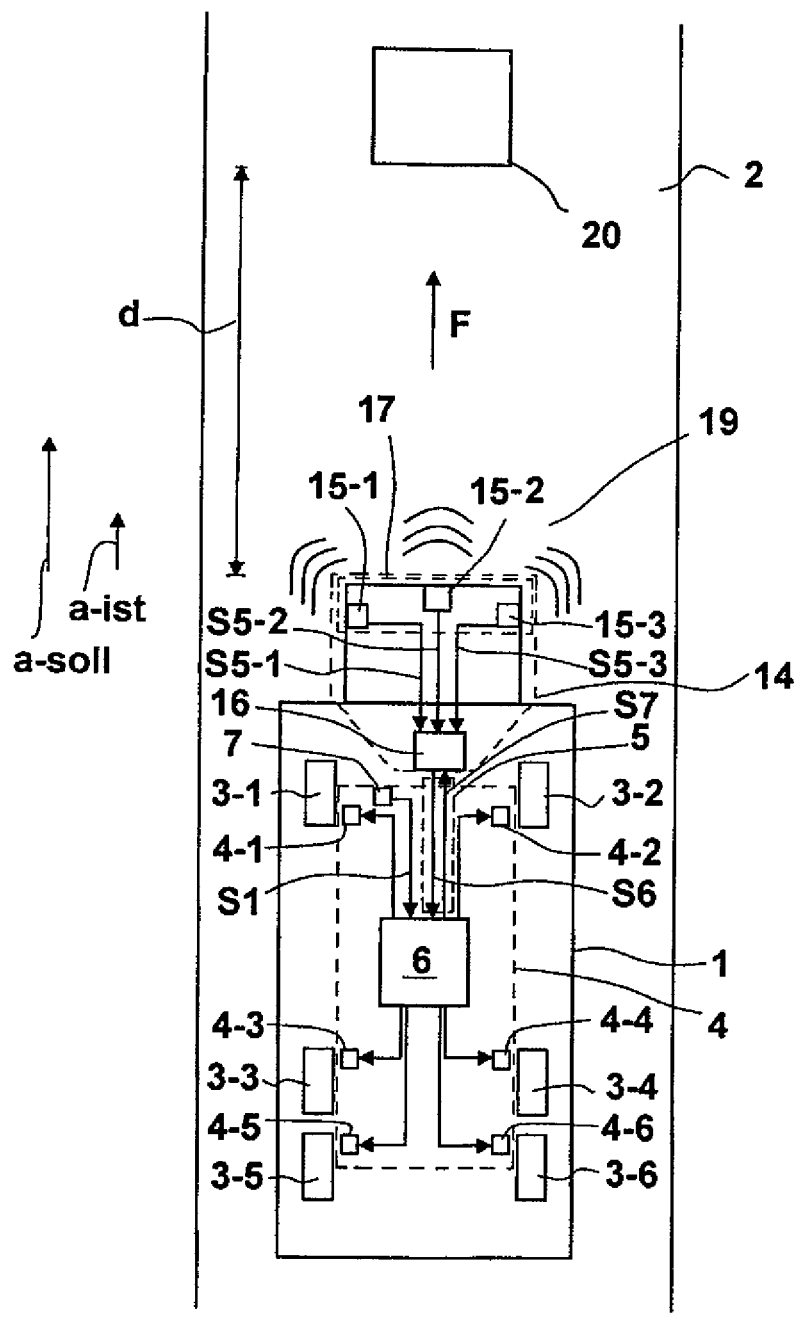
FIG. 1 shows a commercial vehicle having a driver assistance system according to an embodiment of the invention.

A vehicle 1 travels on a roadway 2 in the direction of travel F. The vehicle 1 is, here, a commercial vehicle with three axles and therefore six wheels 3-1, 3-2, 3-3, 3-4, 3-5 and 3-6. The vehicle brake system 4 has pneumatic brakes 4-1, 4-2, 4-3, 4-4, 4-5, 4-6 that each act on the wheels 3-1 to 3-6, with the result that the vehicle 1 can, for example, be braked on a wheel basis or axle basis. In this context, for example, a common compressed air accumulator (not shown) is provided for all the brakes 4-1 to 4-6, or alternatively, in a two-channel brake system with two compressed air accumulators that are correspondingly provided for supplying compressed air to the pneumatic brakes 4-1 to 4-6. The brake system 4 also has a brake control device 6 that can be embodied, in particular, as a control unit known per se. The brake control device 6 can, however, also be formed by a plurality of units. The brake control device 6 receives brake request signals S1 from a brake value signal generator 7 that can be actuated, in particular, by the driver in a manner known per se by means of the brake pedal. The vehicle 1 travels with a longitudinal acceleration a-ist that is positive in the example shown in FIG. 1.

Furthermore, a driving stability control, which detects a driving state of the vehicle 1 from sensor signals and can request, as a function thereof, stability interventions that lead to activation of the individual brakes 4-1 to 4-6, can be implemented in the brake control device 6. This may be, for example, an ABS controller and in addition, for example, also a relatively complex driving stability control for avoiding unstable states such as skidding, tilting, etc., for which purpose, the yaw rate and the lateral acceleration can, for example, be measured. These brake requests constitute internal brake requests of the brake system 4.

The vehicle 1 furthermore has a driver assistance system 14 that has a surroundings detection system 17 and a control unit 16. The surroundings detection system 17 has, in turn, one or more surroundings sensors 15-1, 15-2 and 15-3, and, if appropriate, further elements. The control unit 16 can, however, also be part of one of the sensors 15-1, 15-2 and 15-3. The sensors 15-1 to 15-3 are, for example, configured on a radar basis, laser basis, video image basis or ultrasound basis and detect foreign objects 20 in a surrounding area 19 on or next to the roadway 2. In this context, for example, a distance d of the vehicle 1 from the object 20 is detected. The driver assistance system 14 may be, for example, an ACC (Adaptive Cruise Control) system for setting a predefined distance d from a vehicle 20 that is traveling ahead, or a system for bringing about automatic driving in a line with a plurality of further vehicles 20. Furthermore, the driver assistance system 14 can also be a collision warning system or a system for avoiding collisions or reducing possible collision damage.

The sensors 15-1 to 15-3 transmit measurement signals S5-1, S5-2, S5-3 to the control unit 16, which determines a brake request on the basis of these signals S5-1 to S5-3 and, if appropriate, stored data, and which outputs an external brake request signal S6 to the brake control device 6, for example, via a vehicle-internal data bus such as the CAN bus 5. The external brake request signal S6 can optionally request braking of individual wheels or of all the wheels 3-1 to 3-6. The braking operation requested as a result of this is therefore initiated by the brake control device 6 in accordance with the content of the external brake request signal S6 after the external brake request signal S6 has been received. The brake request signal S6 may be, for example, an XBR message (external brake request) in accordance with the standard SAE J1939-71.

Figure 2:
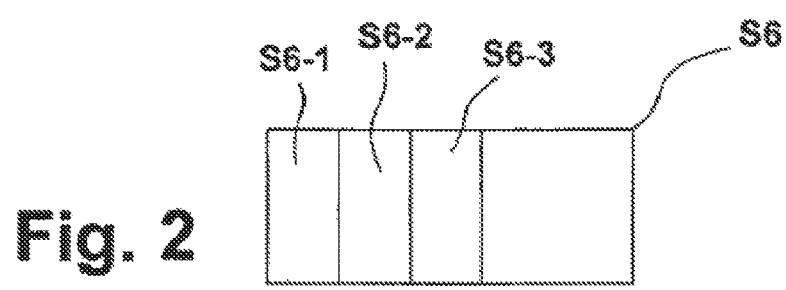
FIG. 2 shows an external brake request signal according to an embodiment of the invention.

FIG. 2 shows an external brake request signal S6 in schematic form. As shown in FIG. 2, the signal S6 contains a priority signal S6-1 for indicating the priority with which this entire brake request signal S6 is to be treated. In this context, the priority signal S6-1 may assume, for example, three levels, specifically lowest, medium and highest. Furthermore, the external brake request signal S6 has a control mode signal S6-2 that can assume, for example, the value "additive" or "maximum". In the case of the "additive" mode, the external brake request is superposed additively on the brake request generated internally in the brake system 4, with the result that the external brake request is applied additionally or additively. In the case of the "maximum" mode, it is, on the other hand, only possible for the maximum value of the setpoint brake value that has already been requested internally by the brake system 4 and of the external setpoint brake value to be formed by the brake control device 6; the externally requested setpoint braking effect is therefore set only if it is higher than the internal brake request. The external brake request signal S6 also has an acceleration request signal S6-3 in which the requested setpoint acceleration value a-soll is given, for example, with a negative sign when braking is requested, and with a positive sign when an acceleration of the vehicle 1 is requested. Furthermore, the brake request signal S6 can also have further components.

The driver assistance system 14 determines, for example, a collision probability from the sensor signals S5-1 to S5-3 and outputs the external brake request signal S6 as a function of the determined collision probability. When a sufficiently high collision probability is detected, a change in the brake system 4 is targeted, with the effect that the brakes 4-1 to 4-6 are biased. Biasing of the pneumatic brakes 4-1 to 4-6 means that the clearance thereof is overcome and therefore, if appropriate, slight contact between the brake linings and the brake disks may already occur. However, no appreciable braking is initiated in the event of such biasing of the brakes 4-1 to 4-6.

If the control unit 16 of the driver assistance system 14 decides to bring about such a biasing of the brake system 4 in order to prepare for possible later braking, it sets the priority signal S6-1 to the highest (or to a high) value, the control mode signal S6-2 to formation of a maximum value "maximum", and the acceleration setpoint value signal S6-3 or its acceleration setpoint value a-soll to such a high value that, when the value is achieved, no braking is initiated. This high value can, in particular, be positive, i.e., a forward acceleration. This is shown, for example, in FIG. 1 by the arrow for a-soll, which is larger than the arrow for a-ist. The acceleration setpoint value signal S6-3 is therefore set, in particular, to an unrealistically high value, which can advantageously not be set at all by the braking operation. In particular, an acceleration setpoint value a-soll can be requested that is larger than the current actual acceleration a-ist, i.e., a relatively strong, forwardly directed acceleration, which therefore cannot be set by a braking effect in any case since it would require a drive force instead of a braking force.

According to one embodiment, the brake control device 6 interprets the external brake request signal S6 to the effect that, where there is a high priority, and where formation of maximum values and an external setpoint value of the acceleration is so high that it cannot be achieved by a braking effect, a biasing process is initiated and the clearance of the brakes 4-1 to 4-6 is overcome. This is correspondingly confirmed in a corresponding response signal S7 from the brake control device 6 to the external control unit 16.

Figure 3:
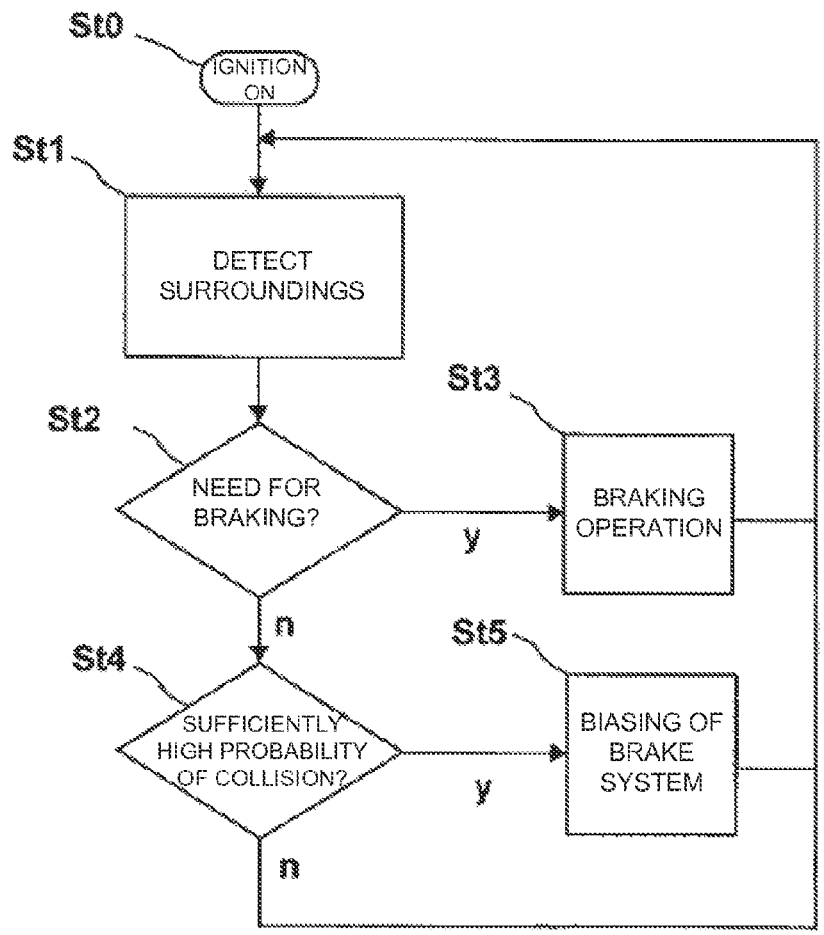
FIG. 3 is a flowchart of a method for controlling a vehicle brake system according to an embodiment of the invention.

The method shown in FIG. 3 starts in step St0, for example, when the ignition of the vehicle 1 is switched on. In step St1, the driver assistance system 14 continuously carries out detection of the surroundings, with the result that its control unit 16 correspondingly receives measurement signals S5-1 to S5-3 from its sensors 15 and evaluates them. If a direct need for braking is detected in the decision step St2, according to branch y, an external brake request signal S6 is output with an actual brake request. The external brake request signal S6 is output with a high priority signal and an acceleration setpoint value signal S6-3 that is correspondingly negative in terms of its sign and correspondingly high in terms of its absolute value, with the result that the brake control device 6 carries out an immediate braking operation in step St3. If no immediate braking is detected in step St2, according to branch n in step St4, it is checked whether there is a sufficiently high probability of a collision, with the result that biasing of the brake system 4 is targetted. If a sufficiently high collision probability is present, according to branch y, the external brake request signal S6 is output with a high priority, maximum value mode, and sufficiently high acceleration setpoint value signal S6-3, with the result that the brake control device 6 detects that no actual braking is desired but biasing of the brake system 4 is to be initiated, and in step St5, this biasing is initiated. The method is in turn reset to before step St1 by all the steps St3 and St5. It should be appreciated that further steps and braking interventions in addition to those of FIG. 3 can also be carried out.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A driver assistance system for a vehicle having a brake system, the driver assistance system comprising:
 a detection system having at least one sensor configured to output measurement signals; and
 a control unit configured to:
  receive at least one measurement signal;
  determine whether the vehicle is in a critical state based on the at least one measurement signal; and
  output an external brake request signal to a brake control device of the brake system for biasing the brake system when the vehicle is determined to be in the critical state, the external brake request signal comprising an acceleration setpoint value signal having a higher acceleration setpoint value than a current actual acceleration value of the vehicle.

2. The driver assistance system as claimed in claim 1, wherein the detection system and the control unit are external to the brake system, and wherein the control unit is configured to output the external brake request signal to the brake control device via a data bus of the vehicle.

3. A driver assistance system for a vehicle having a brake system, the driver assistance system comprising:
 a detection system having at least one sensor configured to output measurement signals; and
 a control unit configured to:
  receive at least one measurement signal;
  determine whether the vehicle is in a critical state based on the at least one measurement signal; and
  output an external brake request signal to a brake control device of the brake system for biasing the brake system when the vehicle is determined to be in the critical state, the external brake request signal comprising an acceleration setpoint value signal having a higher acceleration setpoint value than a current actual acceleration value of the vehicle, wherein the external brake request signal includes a priority signal that makes biasing of the brake system a high priority.

4. A driver assistance system for a vehicle having a brake system, the driver assistance system comprising:
   a detection system having at least one sensor configured to output measurement signals; and
   a control unit configured to:
      receive at least one measurement signal;
      determine whether the vehicle is in a critical state based on the at least one measurement signal; and
      output an external brake request signal to a brake control device of the brake system for biasing the brake system when the vehicle is determined to be in the critical state, the external brake request signal comprising an acceleration setpoint value signal having a higher acceleration setpoint value than a current actual acceleration value of the vehicle, wherein the external brake request signal includes a control mode signal that indicates formation of a maximum value between the external brake request value and an internal brake request value of the vehicle.

5. The driver assistance system as claimed in claim 1, wherein the detection system is a surroundings detection system, and wherein the at least one sensor is configured to sense objects external to the vehicle.

6. The driver assistance system as claimed in claim 5, wherein the at least one sensor is configured to determine a distance from the vehicle to at least one sensed external object, and wherein the control unit is configured to determine whether the vehicle is in the critical state by determining whether a probability of a collision between the vehicle and the at least one sensed external object is sufficiently high based on the determined distance.

7. The driver assistance system as claimed in claim 1, wherein the control unit is configured to determine whether the vehicle is in the critical state by determining whether a probability of at least one of imminent rollover and a skidding state of the vehicle is sufficiently high.

8. The driver assistance system as claimed in claim 1, wherein the acceleration setpoint value signal has a positive acceleration setpoint value for a positive acceleration of the vehicle.

9. The driver assistance system as claimed in claim 1, wherein the control unit is configured to continuously output the external brake request signal via a data bus of the vehicle.

10. A driver assistance system for a vehicle a brake system, the driver assistance system comprising:
   a detection system having at least one sensor configured to output measurement signals; and
   a control unit configured to:
      receive at least one measurement signal;
      determine whether the vehicle is in a critical state based on the at least one measurement signal; and
      output an external brake request signal to a brake control device of the brake system for biasing the brake system when the vehicle is determined to be in the critical state, the external brake request signal comprising an acceleration setpoint signal having a higher acceleration setpoint value than a current actual acceleration value of the vehicle, wherein the control unit is integrated into the at least one sensor.

11. A vehicle comprising:
   the driver assistance system as claimed in claim 1; and
   a brake system having a brake control device and brakes for braking wheels of the vehicle, the brake control device being configured to (i) initiate braking operations on the basis of an internal brake request and the external brake request signal by applying a braking medium to the brakes and (ii) initiate an increase in a pressure of the braking medium such that a lag time of a subsequent braking process is reduced.

12. A vehicle comprising:
   a brake system having a brake control device and brakes for braking wheels of the vehicle, the brake control device being configured to (i) initiate braking operations on the basis of an internal brake request and an external brake request signal by applying a braking medium to the brakes and (ii) initiate an increase in a pressure of the braking medium such that a lag time of a subsequent braking process is reduced, wherein the brake system is a pneumatic brake system having pneumatic brakes, and wherein the brake control device is configured to overcome clearance in the pneumatic brakes such that the brake system is biased; and
   a driver assistance system comprising:
      a detection system having at least one sensor configured to output measurement signals; and
      a control unit configured to:
         receive at least one measurement signal;
         determine whether the vehicle is in a critical state based on the at east one measurement signal; and
         output the external brake request signal to the brake control device of the brake system for biasing the brake system when the vehicle is determined to be in the critical state, the external brake request signal comprising an acceleration setpoint value signal having a higher acceleration setpoint value than a current actual acceleration value of the vehicle.

13. A method for controlling a vehicle brake system, the method comprising:
   determining whether a vehicle is in a critical state; and
   outputting an external brake request signal to a brake control device of the brake system when the vehicle is determined to be in the critical state, the external brake request signal comprising an acceleration setpoint value signal having an acceleration setpoint value that is higher than a current actual acceleration value of the vehicle.

14. The method as claimed in claim 13, wherein determining whether the vehicle is in the critical state comprises determining whether a probability of a critical situation of the vehicle is sufficiently high.

* * * * *